Feb. 19, 1946.    E. W. BULL    2,395,368
AUDIBLE INDICATION FOR RADAR
Filed May 3, 1944
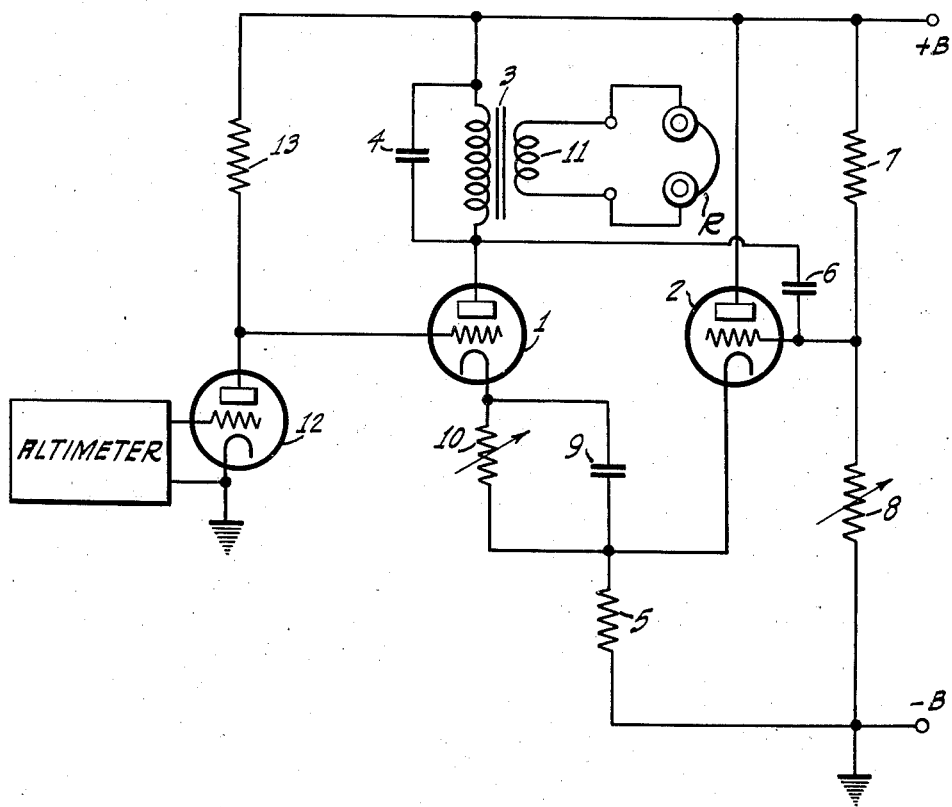
INVENTOR.
ERIC WILLIAM BULL
BY  H.S. Grover
ATTORNEY Patented Feb. 19, 1946

2,395,368

UNITED STATES PATENT OFFICE 2,395,368

AUDIBLE INDICATION FOR RADAR

Eric William Bull, Hounslow, England

Application May 3, 1944, Serial No. 533,863
In Great Britain October 28, 1942

4 Claims. (Cl. 177—311)

This invention relates to apparatus for affording audible indications.

For many purposes it may be desired to afford an audible indication of predetermined values, the indication being intermittent over one range of predetermined values and being continuous over another range of predetermined values. For example, it may be required in altimeters for aircraft to generate when the aircraft is at a predetermined height an intermittent audible indication and when the aircraft is at a different height to generate a continuous audible indication. In such a case it may be desired that above a predetermined height no audible indication is afforded, whilst when the aircraft reaches a predetermined low level the intermittent indication is afforded, the rate of interruption of the indication increasing with decreasing height until at a second predetermined low level the continuous indication is afforded. Alternatively, it may be desired that at all times above a predetermined height the intermittent indication is afforded generating what may be called a "confidence" signal, the confidence signal changing to the continuous indication or danger signal below said predetermined height.

It is the object of the present invention to provide apparatus suitable for affording such audible indications, the apparatus being specially suitable for use in aircraft altimeters but being capable of other uses.

According to the invention, apparatus is provided for affording an audible indication of predetermined values, said audible indication being intermittent over a range of predetermined values and being continuous over another range of predetermined values comprising an electric oscillation generator coupled to a device for producing an audible indication in dependence on the oscillations generated, means for applying control potentials related to said predetermined values to said generator to cause the generation of oscillations, said generator being associated with a blocking circuit arranged to stop the generation of oscillations after predetermined intervals whereby said intermittent audible indication is afforded, such blocking circuit being rendered inoperative to stop the generation of oscillations when the control potentials reach a predetermined value whereby a continuous audible indication is afforded.

The oscillation generator may be of any suitable form, such as a so-called blocking oscillator, employing a single thermionic valve, but preferably the generator comprises a two-valve oscillator of the multi-vibrator type.

In order that the said invention may be clearly understood and readily carried into effect it will now be more fully described with reference to the accompanying drawing which illustrates a circuit diagram of apparatus according to the preferred form of the invention.

As shown in the drawing, the oscillation generator comprises a pair of thermionic valves 1 and 2, the anode of the valve 1 being connected to the positive terminal of a source of anode current through a transformer 3 tuned by condenser 4 to, for example, 1000 C. P. S. The anode of the valve 2 is directly connected to the positive terminal of the source of anode current whilst the two cathodes of the valves are connected through a common cathode resistance 5 to the negative terminal of the source of anode current. The anode of the valve 1 is coupled through a condenser 6 to the control electrode of the valve 2, said electrode also being connected to a potentiometer comprising a resistance 7 and an adjustable resistance 8 connected across the positive and negative terminals of the source of anode current. There is included in the cathode lead of the valve 1 a blocking circuit comprising a condenser 9 and an adjustable leak resistance 10. The secondary winding 11 of the transformer 3 is coupled to a device such as a telephone receiver headset R for generating an audible indication when oscillations are generated by the oscillator described. In order to control the generation of oscillations, control potentials are applied to the control electrode of valve 1 from the anode of a control valve 12 which is connected to the source of anode current through a resistance 13. The control potentials applied to the valve 1 are related to the predetermined values at which the generator is required to generate the intermittent and continuous indications, such control potentials, where the generator is to be employed in conjunction with an aircraft altimeter, being related to the predetermined values of height at which it is desired that the different audible indications should be afforded. The invention is of particular use in connection with a capacity altimeter. In such an altimeter a bridge may be employed which generates potentials which vary with the height of the aircraft and such potentials are therefore suitable after amplification, if necessary, to control the valve 1. An example of such an altimeter is described in Heuschmann Patent 2,230,537, issued February 4, 1941.

The operation of the generator shown in the drawing is as follows: when the control electrode potential of the valve 1 is sensibly lower than the potential applied to the control electrode of valve 2 from the potentiometer comprising the resistances 7 and 8, the generator is inoperative and no audible indication is afforded. Assuming that the aircraft reaches a predetermined height at which the valve 12 applies a potential to the control electrode of valve 1 which is higher than the potential of the control electrode of the valve 2, then under this condition the valve 1 is caused to conduct and the generator then operates to generate oscillations in well known multi-vibrator manner until the condenser 9 charges to such a potential that the valve 1 is rendered non-conducting so as to stop the generation of oscillations. One example of multivibrator operation is described in Potter Patent 2,157,434, issued May 9, 1939. The charge across the condenser 9 then leaks away through the resistance 10 and when the cathode potential falls below that of the control electrode the valve 1 again conducts. The blocking circuit thus serves to interrupt periodically the generation of oscillations thus generating the intermittent audible indication. Assuming that the aircraft is losing height it is arranged that the control potential applied from valve 12 to valve 1 increases with the result that the rate of interruption of the oscillations increases. Finally, if the aircraft continues to lose height, the control potential applied to the valve 1 increases further and although the charge across the condenser 9 reaches a maximum it is insufficient to render the valve 1 non-conducting with the result that the generator generates continuous oscillations thus affording the continuous audible indication.

The point at which the intermittent audible indication is afforded can be controlled by adjusting the potential applied to the control electrode of the valve 2 by adjustment of the variable resistance 8, whilst the point at which the continuous audible indication is generated can be controlled by adjustment of the variable resistance 10. The provision of the common cathode resistance 5 is employed for the purpose of preventing the flow of grid current in either of the valves 1 and 2.

The circuit described above has a high degree of stability and is found not to be appreciably affected by variations in the potential of the anode current source.

If desired, instead of employing the two-valve multi-vibrator type of oscillator described, a valve circuit of the blocking oscillator type may be employed and in such a case it may be preferable to use an hexode valve in order to reduce loading of the electrode to which the control potentials are applied.

Whilst the invention is of particular use for affording an audible indication when used with an aircraft altimeter, it will be understood that the invention is not limited in this respect since it can be employed for other purposes.

I claim as my invention:

1. Apparatus for affording an audible indication of predetermined ranges of values, there being an intermittent audible indication over a range of values lying on one side of a predetermined limit, there being a continuous audible indication over another range of values lying on the other side of said limit, said apparatus comprising an electric oscillation generator coupled to a device for producing an audible indication in dependence on the oscillations generated, means for producing control potentials representative of the values in said ranges of values and for applying them to said generator, means comprising a blocking circuit in said generator for stopping the generation of oscillations periodically in response to the production of control pulses representative of the values lying on said one side of said limit whereby said intermittent audible indication is afforded throughout said first-mentioned range, and means for rendering said blocking circuit inoperative to stop the generation of oscillations in response to the control potentials reaching values representative of the values lying on the other side of said limit whereby a continuous audible indication is afforded through said other range.

2. Apparatus according to claim 1 wherein said oscillation generator comprises a two-valve oscillator, the cathodes of the two valves being coupled together through a common resistance and in which the cathode circuit of one of the valves is provided with said blocking circuit which comprises a resistance shunted by a condenser.

3. The invention according to claim 1 wherein an altimeter is provided which supplies control potentials that vary in magnitude as the height changes whereby said audible indications are obtained at different predetermined values of height.

4. Apparatus for affording an audible indication of predetermined ranges of values, there being no audible indication over a first range of predetermined values, there being an intermittent audible indication over the next or intermediate range of predetermined values and there being a continuous audible indication over the next or last range of predetermined values, said apparatus comprising an electric oscillation generator coupled to a device for producing an audible indication in dependence on the oscillations generated, means for producing control potentials representative of said predetermined values and for applying them to said generator, means for rendering said generator inoperative in response to the production of control pulses representative of said first range whereby no audible indication is afforded, means comprising a blocking circuit in said generator for stopping the generation of oscillations periodically in response to the production of control pulses representative of said intermediate range of values whereby said intermittent audible indication is afforded throughout said intermediate range, and means for rendering said blocking circuit inoperative to stop the generation of oscillations in response to the control potentials reaching values representative of the next or last range of values whereby a continuous audible indication is afforded through said last range.

ERIC WILLIAM BULL.